(12) United States Patent
Balsiger et al.

(10) Patent No.: US 9,751,617 B2
(45) Date of Patent: Sep. 5, 2017

(54) MULTI-SLICE ROTARY ELECTROMECHANICAL ACTUATOR

(71) Applicant: Hamilton Sundstrand Corporation, Windsor Locks, CT (US)

(72) Inventors: Derick S. Balsiger, Mayer, AZ (US); Nicholas R. Van De Veire, Tempe, AZ (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 142 days.

(21) Appl. No.: 14/558,012

(22) Filed: Dec. 2, 2014

(65) Prior Publication Data

US 2016/0152322 A1 Jun. 2, 2016

(51) Int. Cl.
| | |
|---|---|
| *H02K 7/10* | (2006.01) |
| *B64C 13/28* | (2006.01) |
| *H02K 41/06* | (2006.01) |
| *B64C 9/00* | (2006.01) |
| *B64C 13/50* | (2006.01) |
| *H02K 7/14* | (2006.01) |
| *H02K 16/02* | (2006.01) |

(52) U.S. Cl.
CPC ............ *B64C 13/28* (2013.01); *H02K 41/06* (2013.01); *B64C 9/00* (2013.01); *B64C 13/50* (2013.01); *B64C 2009/005* (2013.01); *H02K 7/14* (2013.01); *H02K 16/02* (2013.01)

(58) Field of Classification Search
CPC ... H02K 7/06; H02K 7/10; H02K 7/11; F16H 1/20; F16H 7/16; F16H 49/00; F16H 63/18; F16H 61/32; F16H 33/00; F16H 37/02; F16D 27/14; F16D 27/10
See application file for complete search history.

(56) References Cited

U.S. PATENT DOCUMENTS

| | | | | |
|---|---|---|---|---|
| 5,850,765 | A | * | 12/1998 | Shirasawa ............. F16H 49/001 475/162 |
| 5,906,142 | A | * | 5/1999 | Shirasawa ............. F16H 49/001 74/640 |
| 7,213,487 | B2 | * | 5/2007 | Tanioka ................ F16H 49/001 74/640 |
| 2012/0074820 | A1 | * | 3/2012 | Takeuchi ............... H02K 7/116 310/75 R |

FOREIGN PATENT DOCUMENTS

| | | |
|---|---|---|
| GB | 734446 A | 8/1955 |
| WO | 2004040737 A1 | 5/2004 |

OTHER PUBLICATIONS

Extended European Search Report for corresponding EP Application No. 15197495.3-1809, dated May 19, 2016, pp. 1-7.

* cited by examiner

*Primary Examiner* — Tran Nguyen
(74) *Attorney, Agent, or Firm* — Cantor Colburn LLP

(57) ABSTRACT

A multi-slice electromechanical hinge-line rotary actuator includes a motor stator configured to generate rotational motion about a rotational axis. The multi-slice electromechanical hinge-line rotary actuator further includes a plurality of layers rotatably coupled to the motor stator. Each layer includes an output arm slice configured to rotate about the rotational axis in response to the rotational motion.

8 Claims, 6 Drawing Sheets

MULTI-SLICE ROTARY ELECTROMECHANICAL ACTUATOR

TECHNICAL FIELD

This invention generally relates to an actuator and, more specifically, to an electromechanical hinge-line rotary actuator for use with a thin-wing aircraft in flight-control applications.

BACKGROUND OF INVENTION

Recent trends have driven use of hinge-line rotary electromechanical actuators (EMA) to manipulate the movement of an aircraft aileron, for example. A rotational axis of the hinge-line EMA is aligned with that of the aileron and the actuator acts as a hinge (hence, the term "hinge-line"), which allows angular rotation of the aileron. Typical electromechanical hinge-line rotary actuator designed for flight-control applications are arranged to use a conventional motor that is framed (i.e., encased, housed, or mounted) and includes a rotor. The rotor is disposed inside the frame and indirectly connected to an end of a planetary gearbox or gear set through a drive shaft or coupler. In this way, the motor is disposed exterior to and in alignment with the gear set, and there are bearings for the motor and gear set. Such alignment is accomplished by a precision-machined housing for the motor and gear set or compliant coupling on an output shaft of the motor to an input of the gear set.

The conventional hinge-line EMA housing, however, is susceptible to jamming that may occur due to excessive load applied to the EMA in response to bending the wings. In addition, aircraft wings typically realize a load during flight, which causes the wings to bend. The bending of the wings in turn applies undesirable stress on conventional hinge-line EMAs.

SUMMARY

According to embodiment, a multi-slice electromechanical hinge-line rotary actuator includes a motor stator configured to generate rotational motion about a rotational axis. The multi-slice electromechanical hinge-line rotary actuator further includes a plurality of layers rotatably coupled to the motor stator. Each layer includes an output arm slice configured to rotate about the rotational axis in response to the rotational motion.

According to another embodiment, a method of reducing stress applied to a multi-slice electromechanical hinge-line rotary actuator coupled to an aircraft wing comprises radially extending along a first direction a plurality of ground arm slices from a motor stator configured to generate rotational motion about a rotational axis. The method further comprises radially extending along a second direction opposite the first direction a plurality of output arm slices from the motor stator. Each output arm slice and ground arm slice define a clearance gap therebetween. The method further comprises flexing the at least one of the ground arm slices and the output arm slices into at least one of the clearance gaps in response to flexing the aircraft wing.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
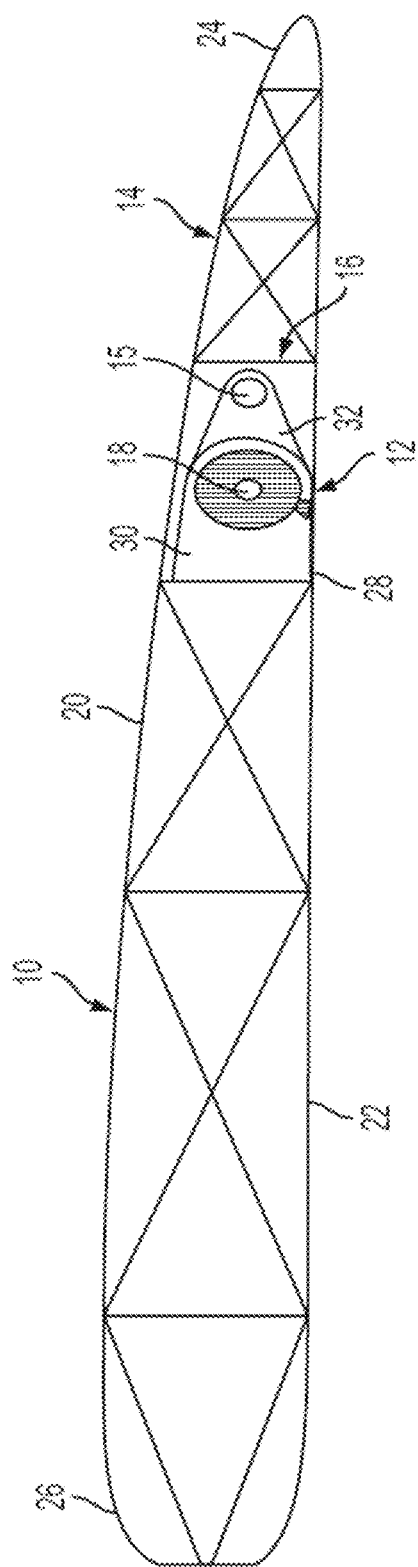
FIG. 1 is an end view of a non-limiting exemplary embodiment of a wing of an aircraft provided with an electromechanical hinge-line rotary actuator according to a non-limiting embodiment.
Figure 2:
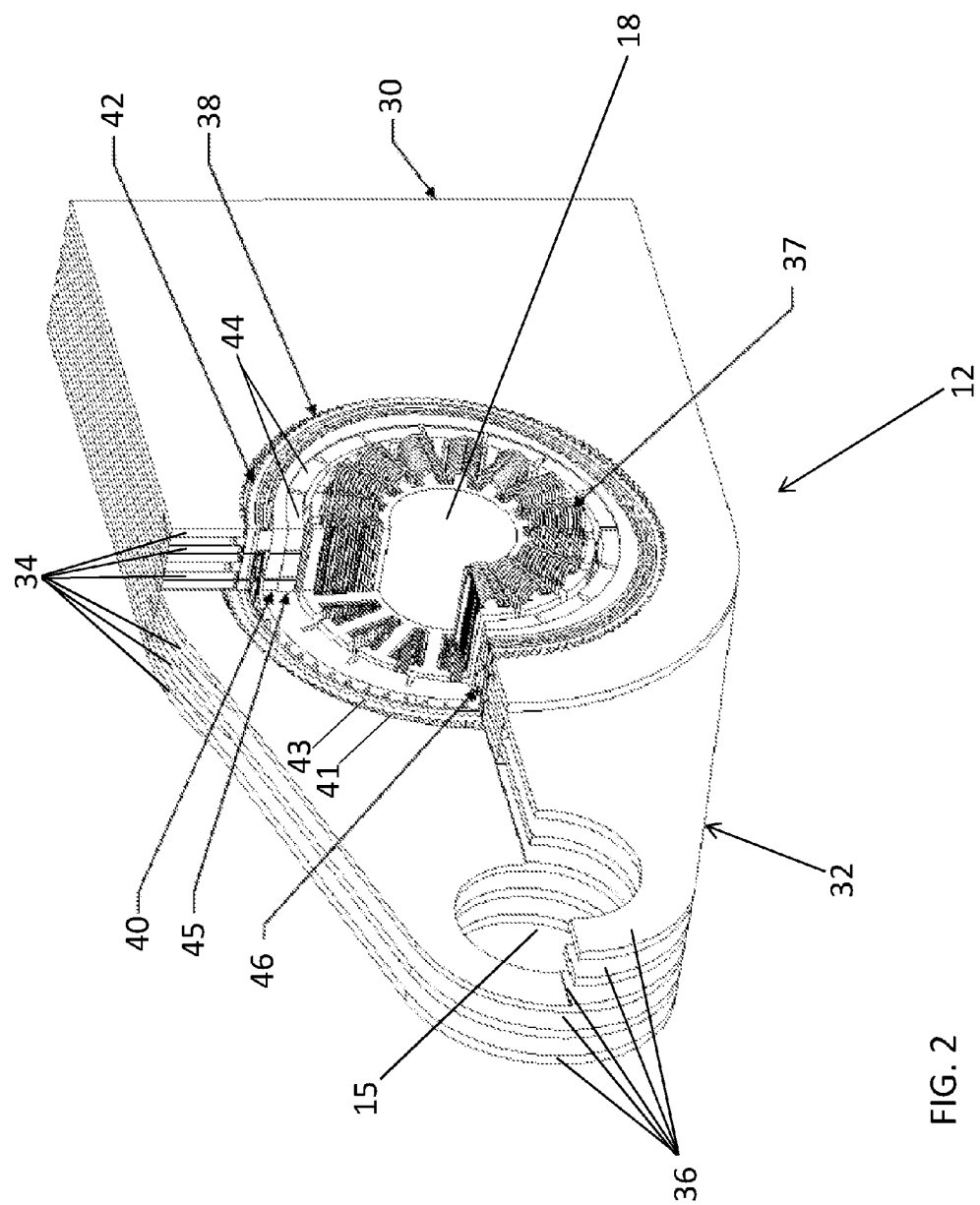
FIG. 2 is perspective view showing a partial cutaway of a multi-slice EMA according to a non-limiting embodiment.
Figure 3:
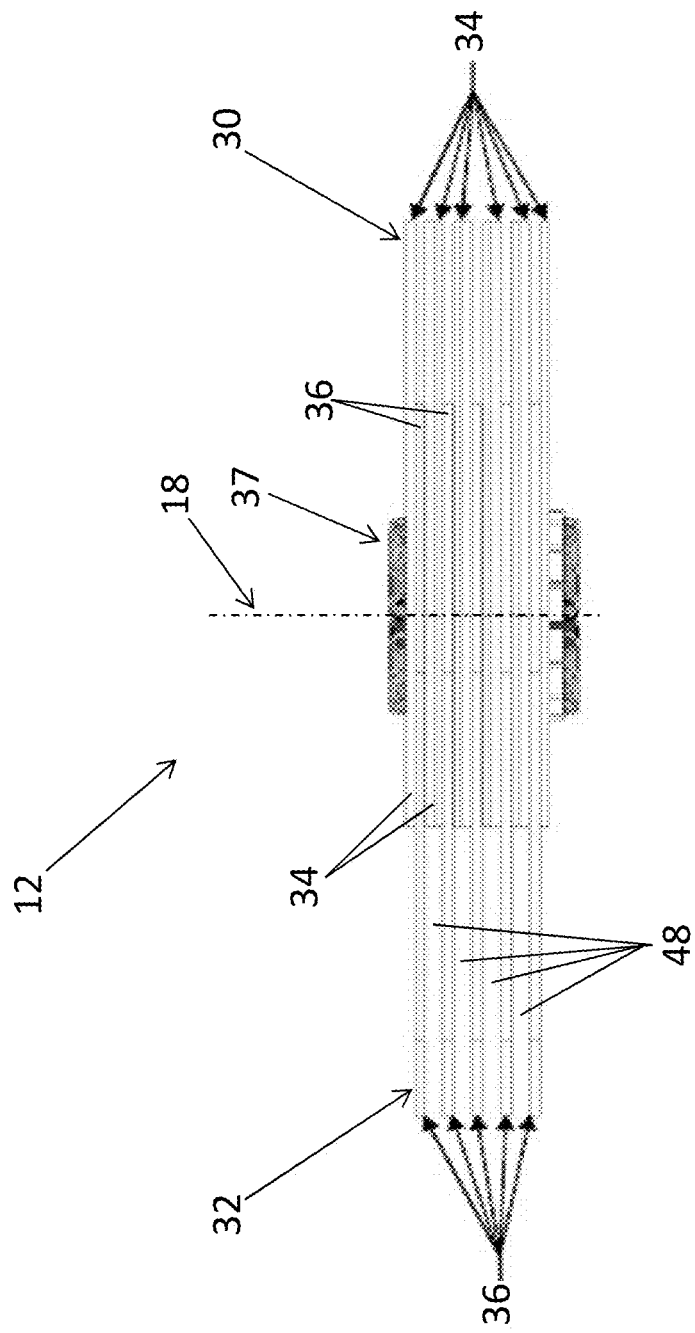
FIG. 3 is an illustration of the multi-slice EMA according to a first orientation.
Figure 4:
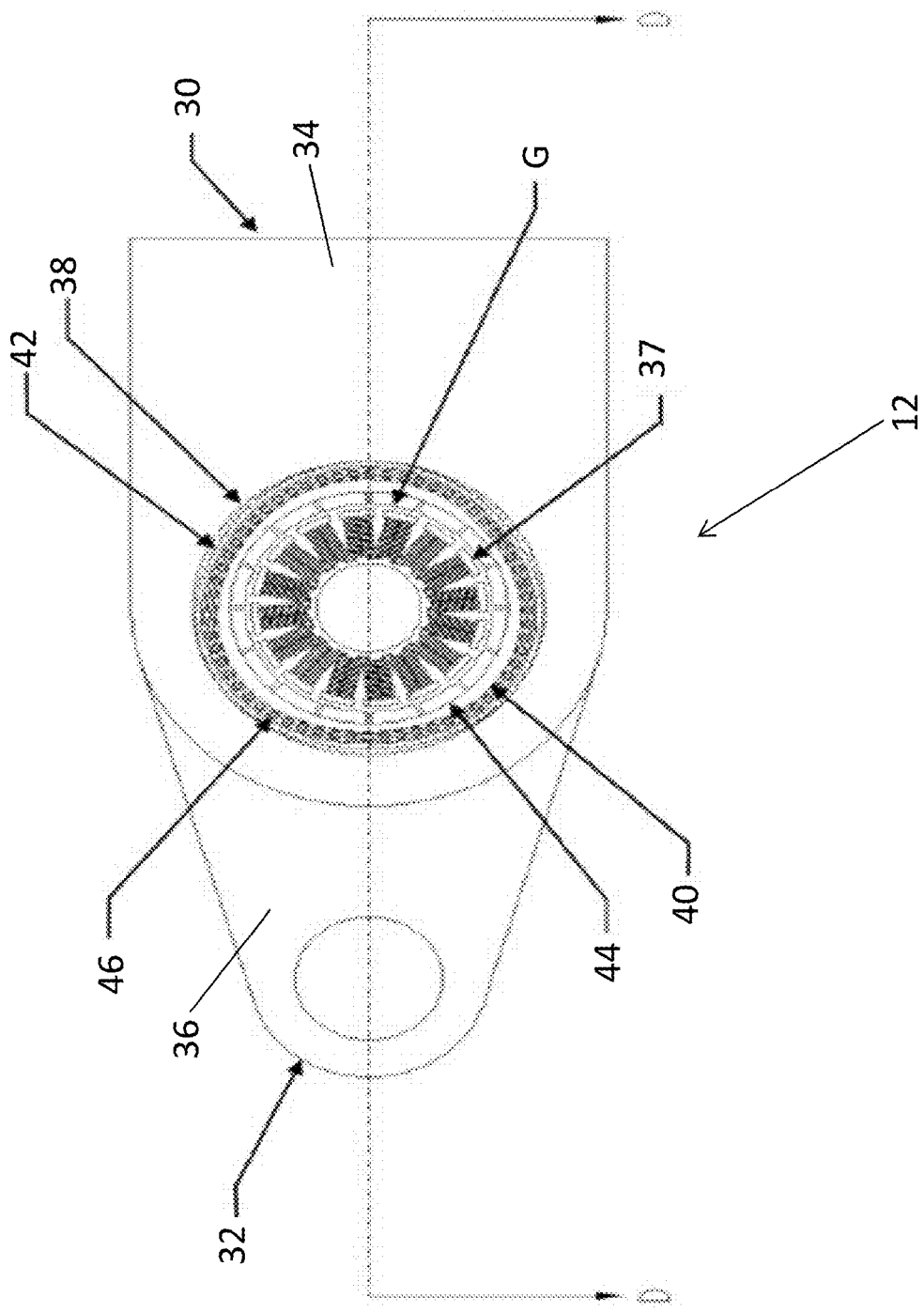
FIG. 4 is an illustration of the multi-slice EMA according to a second orientation.
Figure 5:
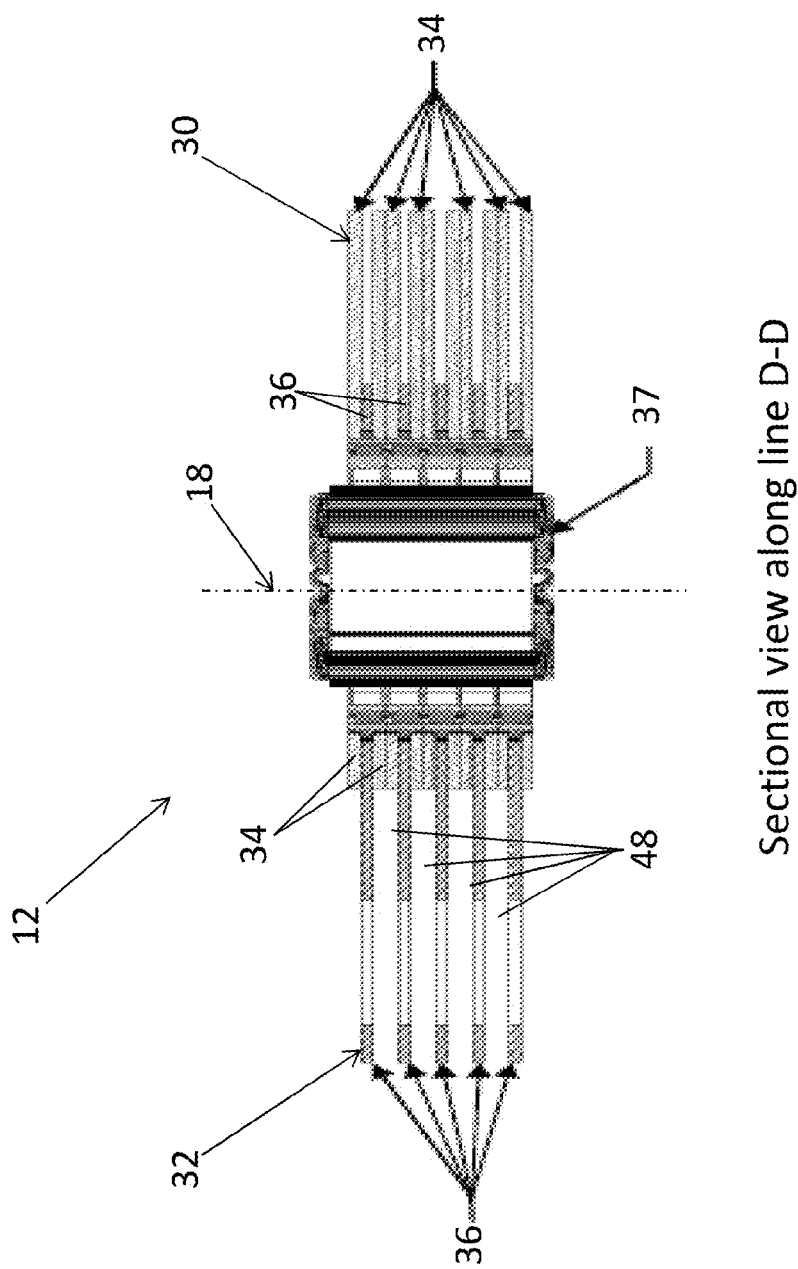
FIG. 5 is a cross-section view of the multi-slice EMA taken along the line D-D.
Figure 6:
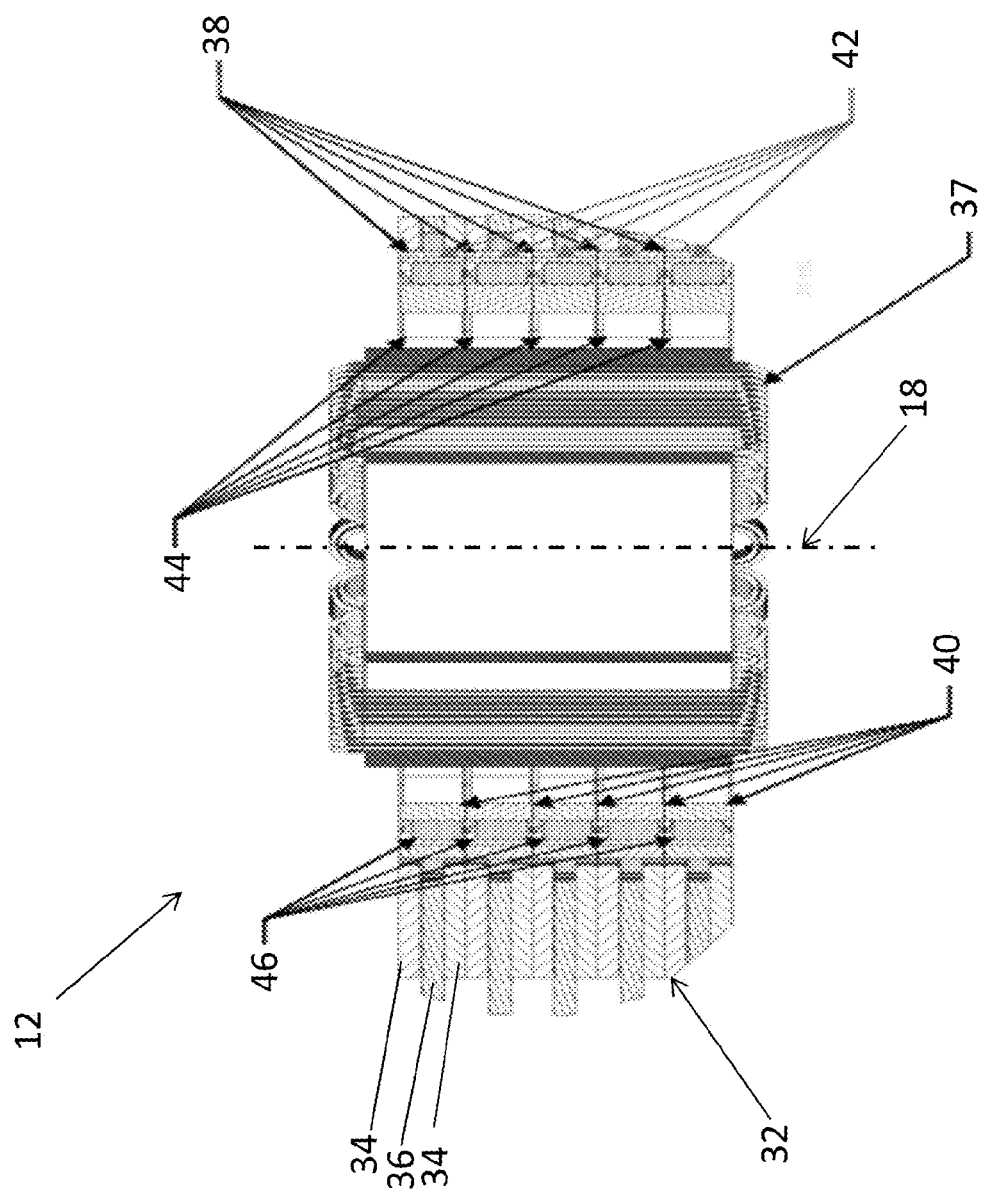
FIG. 6 is a close-up view of the actuator assembly of the multi-slice EMA according to a non-limiting embodiment.

Referring now to FIG. 1, a non-limiting exemplary embodiment of an aircraft wing 10 including a multi-slice hinge-line rotary electro-mechanical actuator 12, hereinafter referred to as a multi-slice EMA 12. Although the wing 10 is disclosed herein as being implemented with a non-rotary-wing aircraft, such as an airplane, it should be appreciated that the wing 10 can be implemented with any suitable type of aircraft, including a rotary-wing aircraft such as, for example, a helicopter.

As shown in FIG. 1, the wing 10 is one of two substantially similar wings of a lift system of the aircraft (in contrast, a rotor blade would be one of a plurality of substantially similar rotor blades of a rotor system of a helicopter). The wing 10 defines a root portion (not shown) that extends to tip portion (not shown) through an aileron portion, generally indicated at 14, which acts as a flight-control or an output-control surface (such as a wing flap). The aileron portion 14 includes a spar, generally indicated at 16, and also defines an axis of motion or rotation which is aligned with a rotational axis 18 of the multi-slice EMA 12. The wing 10 defines further first and second opposing surfaces 20, 22, a trailing edge 24, and an opposing, leading edge 26 and includes a rearward spar, generally indicated at 28.

The multi-slice EMA 12 is coupled to the wing 10 and is controlled in response to receiving one or more controls signals output from an electronic controller (not shown). The multi-slice EMA 12 defines a rotational axis 18 that is aligned with the axis of rotation of the aileron portion 14. The controller may be mounted to or near the multi-slice EMA 12 and is operatively linked to the multi-slice EMA 12 and a control system (not shown).

A stationary attachment bracket or ground arm portion, generally indicated at 30, of the multi-slice EMA 12 is fixedly mounted to the wing rearward spar 28 and configured to be attached to interior structure of the wing 10. A rotatable output arm portion, generally indicated at 32, of the multi-slice EMA 12 is movably mounted to a frame of or within an interior of the portion to be controlled, in this case for example, the aileron portion 14. For example, a bolt may be fed through a mounting eyelet 18 of the output arm portion 32, and is fastened to the aileron portion 14. In this manner, the multi-slice EMA 12 can be driven by one or more control signals such that the output arm portion 32 controls the angle of the aileron portion 14. It should be appreciated that the control system can also define a plurality of control surfaces (not shown) arranged within the aileron portion 14 and selectively deployed between the first and second surfaces 20, 22 to affect flight dynamics of the wing 10. Each surface defines first and second surface portions. The multi-slice EMA 12 is configured to rotate the surface from a first or neutral position, such that the surface is disposed within the wing 10, to a second or deployed position, such that the surface extends out an outer periphery of the wing 10. It should be appreciated that the above description is provided for the sake of completeness and to enable a better understanding of one non-limiting exemplary application of the multi-slice EMA 12.

Referring now to FIGS. 2-6, the ground arm portion 30 and the output arm portion each comprise a plurality of individual sliced portions. More specifically, the ground arm portion 30 includes a plurality of ground arm slices 34 and the output arm portion 32 includes a plurality of output arm slices 36. The ground arm slices 34 extend radially from the rotational axis 18 along a first direction, and the output arm slices 36 extend radially from the rotational axis 18 along a second direction opposite the first direction. Each of the ground arm slices 34 and the output arm slices 36 are formed from a flexible material, and are configured to move (e.g., flex) with respect to one another as the wing 10 flexes in response to an applied load. According to an embodiment, the ground arm slices 34 and an output arm slices 36 are formed from, for example, aluminum, steel, stainless steel, carbon fiber or other composites and have a thickness ranging from approximately 0.04 inches to approximately 0.2 inches. In this manner, the multi-slice EMA 12 does not put undue stress on the wing 10 at points of attachment when flex is encountered, while also reducing the stress applied to the multi-slice EMA 12 itself as discussed in greater detail below.

According to an embodiment, a single output arm slice 36 interposed between a pair of ground arm slices 34 defines an individual layer of the multi-slice EMA 12. The plurality of layers, i.e., the plurality of ground arm slices 34 and the plurality of output arm slices 36, are vertically arranged along the rotational axis 18 such that the stress applied to the multi-slice EMA 12 is distributed in a parallel manner among the plurality of ground arm slices 34 and the plurality of output arm slices 36. The layers are coupled to a common stator 37, which in turn transfers a rotational drive force to each output arm slice 36.

Each layer of the multi-slice EMA 12 includes a harmonic drive ring gear 38, a harmonic wave generator assembly 40, and a harmonic drive flex spline 42. The harmonic drive ring gear 38 includes a first toothed portion 41 and disposed about the rotational axis 18 with individual teeth extending radially inward. The harmonic wave generator assembly 40 is disposed about the rotational axis 18 and has a central radial portion and an outer radial portion that are separated from one another by a radial air gap G. The outer radial portion of the harmonic wave generator assembly 40 includes a motor rotor 45 magnetically coupled to the stator 37. One or more rotor magnets 44 are coupled to the motor rotor 45 to facilitate rotation thereof during operation of the harmonic wave generator assembly 40. The stator 37 is configured to drive rotation of the motor rotor 45 included in each layer of the multi-slice EMA 12 about the rotational axis 18 thereby forming a configuration in which an electric motor is embedded within a harmonic drive.

The harmonic drive flex spline 42 is radially interposed between the harmonic drive ring gear 38 and the harmonic wave generator assembly 40. The harmonic drive flex spline 42 may be formed of spring steel, for example, and is sized such that deflection of the harmonic drive flex spline 42 is less than the elastic fatigue limit of the harmonic drive flex spline 42 for an infinite number of deflections. The harmonic drive flex spline 42 includes a second toothed portion 43 with individual teeth extending radially outward, and a roller bearing assembly 46. The roller bearing assembly 46 includes one or more bearings and a flexible bearing retainer having inner and outer diameters. The inner diameter of the flexible bearing retainer is disposed in contact with the bearings to facilitate rotational drive output to each output arm slice 36.

When the harmonic wave generator assembly 40 is activated, current is applied to one or more conductive elements such that a flux field is generated which interacts with the rotor magnets 44 and causes the motor rotor 45 of the harmonic wave generator assembly 40 to rotate about the rotational axis 18 in a first direction. During such rotation, the harmonic drive flex spline 42 is forced to deflect radially outward, which in turn, causes the harmonic drive ring gear 38 to rotate about the rotational axis 18 in a second direction, which is opposite the first direction. Continued rotation of the motor rotor 45 in the first direction thus results in continued rotation of the harmonic drive ring gear 38 in the second direction with the difference in the numbers of the individual teeth defining a difference in relative rotational speeds of the motor rotor 45 and the harmonic drive ring gear 38. The rotational drive is transferred to the drive output to each output arm slice 36, which in turn rotates to manipulate and control the angle of the aileron portion 14.

According to a non-limiting embodiment, each ground arm slice 34 is separated from an adjacent output arm slice 36 by a distance ranging from approximately 0.001 inches to approximately 0.005 inches. The distance between the ground arm slices 34 and the output arm slices 36 provides a clearance gap 48 that allows one or more ground arm slices 34 and/or one or more output arm slices 36 to flex with respect to one another. In addition, the harmonic drive ring gear 38, the harmonic wave generator assembly 40, and the harmonic drive flex spline 42 included in each layer are configured to flex into the clearance gap in response to bending the aircraft wing 10. In this manner, the multi-slice EMA 12 is configured to mitigate excessive stress caused by wing bending that typically occurs during flight of the aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multi-slice electromechanical hinge-line rotary actuator comprising:
a motor stator magnetically coupled to a motor rotor that rotates about a rotational axis, the motor stator magnetically configured to generate rotational motion about a rotational axis; and
a plurality of layers rotatably coupled to the motor stator via a roller bearing assembly that is rotatably coupled to the rotor via a roller bearing assembly, each layer including an output arm slice receiving a rotational drive force transferred by the roller bearing assembly such that each output arm slice rotates about the rotational axis in response to the rotational motion.

2. The multi-slice electromechanical hinge-line rotary actuator of claim 1, wherein each layer further includes a first ground arm slice and a second ground arm slice, the output arm slice interposed between the first and second ground arm slices and configured to rotate about the rotational axis with respect to the first and second ground arm slices.

3. The multi-slice electromechanical hinge-line rotary actuator of claim 2, wherein the first ground arm slice, the second ground arm slice, and the output arm slice are spaced apart from one another by distance to define a clearance gap.

4. The multi-slice electromechanical hinge-line rotary actuator of claim 3, wherein the first and second ground arm slices extend radially from the motor stator along a first direction, and wherein the output arm slices extend radially from the motor stator along a second direction opposite the first direction.

5. The multi-slice electromechanical hinge-line rotary actuator of claim 4, wherein each layer comprises:
a harmonic drive ring gear;
a harmonic wave generator assembly comprising the motor rotor that rotates in response to the rotational motion generated by the motor stator; and
a harmonic drive flex spline radially interposed between the harmonic drive ring gear and the motor rotor, the harmonic drive flex spline comprising a toothed portion and the roller bearing assembly rotatably supportive of the motor rotor within the toothed portion.

6. The multi-slice electromechanical hinge-line rotary actuator of claim 5, wherein the first ground arm slice, the second ground arm slice, and the output arm slice each comprise a flexible material.

7. The multi-slice electromechanical hinge-line rotary actuator of claim 6, wherein the first ground arm slice, the second ground arm slice, and the output arm slice are each configured to flex with respect to one another.

8. The multi-slice electromechanical hinge-line rotary actuator of claim 7, wherein the harmonic drive ring gear, the harmonic wave generator assembly, and the harmonic drive flex spline included in each layer are configured to flex into the clearance gap.

* * * * *